(12) United States Patent
Tamura et al.

(10) Patent No.: US 12,012,052 B2
(45) Date of Patent: Jun. 18, 2024

(54) WIRE HARNESS, WIRE HARNESS MANUFACTURING METHOD, AND WIRE HARNESS ROUTING STRUCTURE

(71) Applicant: YAZAKI CORPORATION, Tokyo (JP)

(72) Inventors: Issei Tamura, Makinohara (JP); Masahiro Kochibe, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 424 days.

(21) Appl. No.: 17/572,580

(22) Filed: Jan. 10, 2022

(65) Prior Publication Data

US 2022/0227316 A1 Jul. 21, 2022

(30) Foreign Application Priority Data

Jan. 20, 2021 (JP) ................................. 2021-007201

(51) Int. Cl.
*B60R 16/02* (2006.01)
*H01B 7/00* (2006.01)
*H01B 13/012* (2006.01)
*H02G 3/30* (2006.01)

(52) U.S. Cl.
CPC ...... *B60R 16/0215* (2013.01); *B60R 16/0207* (2013.01); *H01B 7/0045* (2013.01); *H01B 13/01209* (2013.01); *H01B 13/01263* (2013.01); *H02G 3/305* (2013.01)

(58) Field of Classification Search
CPC ... H01B 7/0045; B60R 6/0207; B60R 6/0215; H02G 3/305; H02G 3/266
See application file for complete search history.

(56) References Cited

U.S. PATENT DOCUMENTS

| | | | |
|---|---|---|---|
| 2005/0153576 A1* | 7/2005 | Fukuda ................ | H01B 7/0045 439/34 |
| 2016/0055938 A1* | 2/2016 | Hamabayashi .. | H01B 13/01263 174/72 A |
| 2016/0280157 A1* | 9/2016 | Katou ....................... | B60N 2/02 |
| 2021/0309168 A1* | 10/2021 | Kisu ..................... | H02G 3/305 |

FOREIGN PATENT DOCUMENTS

JP 2000-4530 A 1/2000

* cited by examiner

*Primary Examiner* — Paresh Paghadal
(74) *Attorney, Agent, or Firm* — KENEALY VAIDYA LLP

(57) ABSTRACT

A wire harness includes a first harness and a second harness having a plurality of branch lines. The first harness and the second harness are combined and bound, and each of terminals of the first harness and the second harness is extended radially. Exteriors of the first harness and the second harness are removed within a combination range of the first harness and the second harness. The first harness extends across near a base end of one branch line of the second harness, and is bound with a tape near a branch portion together with a vicinity of a base end of another branch line in a juxtaposed state.

4 Claims, 4 Drawing Sheets

WIRE HARNESS, WIRE HARNESS MANUFACTURING METHOD, AND WIRE HARNESS ROUTING STRUCTURE

CROSS-REFERENCE TO RELATED APPLICATIONS

This application is based on and claims priority under 35 USC 119 from Japanese Patent Application No. 2021-007201 filed on Jan. 20, 2021, the contents of which are incorporated herein by reference.

TECHNICAL FIELD

The present invention relates to a wire harness mounted on a vehicle, a method for manufacturing a wire harness, and a routing structure of a wire harness.

BACKGROUND ART

For example, in a branch portion of a wire harness used in an automobile, fixing and shape protection of the branch portion is performed by winding a tape around an electric wire bundle according to a predetermined procedure (for example, refer to Patent Literature 1).

In a branching method, in many cases, a single wire bundle is generally simply branched into a plurality of wires, but depending on a demand of a customer to which the wire harness is delivered, a branch portion may be formed by combining a plurality of electric wire bundles. For example, a wire harness in which terminals of the electric wire bundles extend radially may be configured by combining a first harness formed of a single linear electric wire bundle and a second harness having a branch portion in which two branch lines are branched from a trunk line, and binding the two harnesses by winding a tape at the branch portion.

In such a case, since there is a portion where one electric wire bundle extends across the other electric wire bundle, that is, a portion where the one electric wire bundle and the other electric wire bundle are overlapped, a level difference is generated in a height direction. That is, the electric wire bundles are stacked. At this time, depending on how the electric wire bundles are handled in an extending direction, the height (the height of the branch portion) of the overlapping portion of a binding portion between the first harness and the second harness may become too large.

In a vehicle such as an electric vehicle or a hybrid vehicle, a battery pack using a large number of battery cells is mounted as a traveling driving power source. Among wire harnesses used in a wiring system of this type of battery pack, there is a wire harness for measuring voltages of a large number of battery cells constituting a battery module of the battery pack. In this wire harness, since one terminal of each of a large number of electric wires is connected to a voltage measurement device, and the other terminal thereof is connected to a bus bar module connecting terminals of the battery cells, the wire harness is often routed in a narrow space. For example, the wire harness is often routed in the narrow space (a bottom surface space of the battery pack) or the like between a housing bottom surface of the battery pack and a support member on which the battery module is fixedly mounted.

CITATION LIST

Patent Literature

Patent Literature 1: JP-2000-4530-A

However, when a wire harness formed by combining a plurality of harnesses as described above is routed in a narrow space of the bottom surface of the battery pack, it has been found that the height of the overlapping portion of the harness becomes an obstacle and the wire harness cannot be routed.

SUMMARY OF INVENTION

The present invention has been made in view of the above-described circumstances, and an object of the present invention is to provide a wire harness that can minimize a height of an overlapping portion of two harnesses to be combined and can be routed without any trouble in a narrow space, a method for manufacturing the wire harness, and a routing structure of the wire harness.

According to one embodiment, the wire harness includes a first harness and a second harness having a trunk line and a plurality of branch lines branched from the trunk line. The first harness and the second harness are combined and bound at a position of a branch portion from the trunk line to the branch lines, each of terminals of the first harness and the second harness is extended from the position of the branch portion, exteriors of the first harness and the second harness are removed within a combination range of the first harness and the second harness, and the first harness extends across a vicinity of a base end of one branch line among the plurality of branch lines of the second harness at a position near the branch portion, and is bound with a binding material in the vicinity of the branch portion together with a vicinity of a base end of another branch line in a juxtaposed state.

According to another embodiment, a method for manufacturing a wire harness having a first harness and a second harness having a trunk line and a plurality of branch lines branched from the trunk line is provided. The method includes combining and binding the first harness and the second harness at a position of a branch portion from the trunk line to the branch lines; extending each of terminals of the first harness and the second harness from the position of the branch portion; removing exteriors of the first harness and the second harness within a combination range of the first harness and the second harness; routing the second harness on a jig plate, and routing the first harness on the second harness; while causing the first harness to extend across a vicinity of a base end of one branch line among the plurality of branch lines of the second harness, pushing the first harness into the branch portion of the second harness and juxtaposing the first harness to a vicinity of a base end of another branch line; and subsequently, in the vicinity of the branch portion, binding the first harness by a binding material together with the vicinity of the base end of the other branch line.

According to further another embodiment, a routing structure of a wire harness in a narrow space formed by electrical components mounted on a vehicle is provided. The wire harness includes a first harness and a second harness having a trunk line and a plurality of branch lines branched from the trunk line. The wire harness has a shape in which each of terminals of the first harness and the second harness are extended from a position of a branch portion by combining and binding the first harness and the second harness at a position of the branch portion from the trunk line to the branch lines. The first harness and the second harness are in a state in which exteriors are removed within a combination range of the first harness and the second harness. The first harness extends across a vicinity of a base end of one branch line among the plurality of branch lines of the second harness at a position in a vicinity of the branch portion, and is bound with a binding material in the vicinity of the branch portion together with a vicinity of a base end of another branch line in a juxtaposed state, and the wire harness is routed in the narrow space.

BRIEF DESCRIPTION OF DRAWINGS

FIG. 2A and FIG. 2B are views illustrating a tape winding procedure in the case of manufacturing the wire harness of the embodiment, in which FIG. 2A is a procedure explanatory view of a first half part, and FIG. 2B is a procedure explanatory view of a second half part.

DESCRIPTION OF EMBODIMENTS

A specific embodiment of the present invention will be described below with reference to the drawings.

Figure 1:
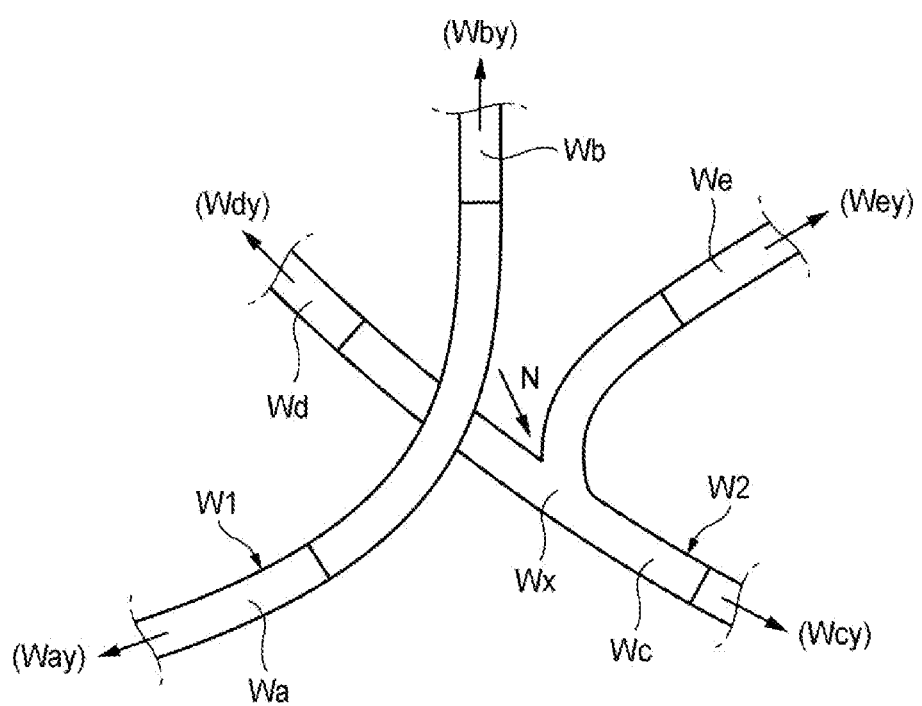
FIG. 1 is a view illustrating a first step in a case of manufacturing a wire harness according to an embodiment of the present invention.
Figure 2A:
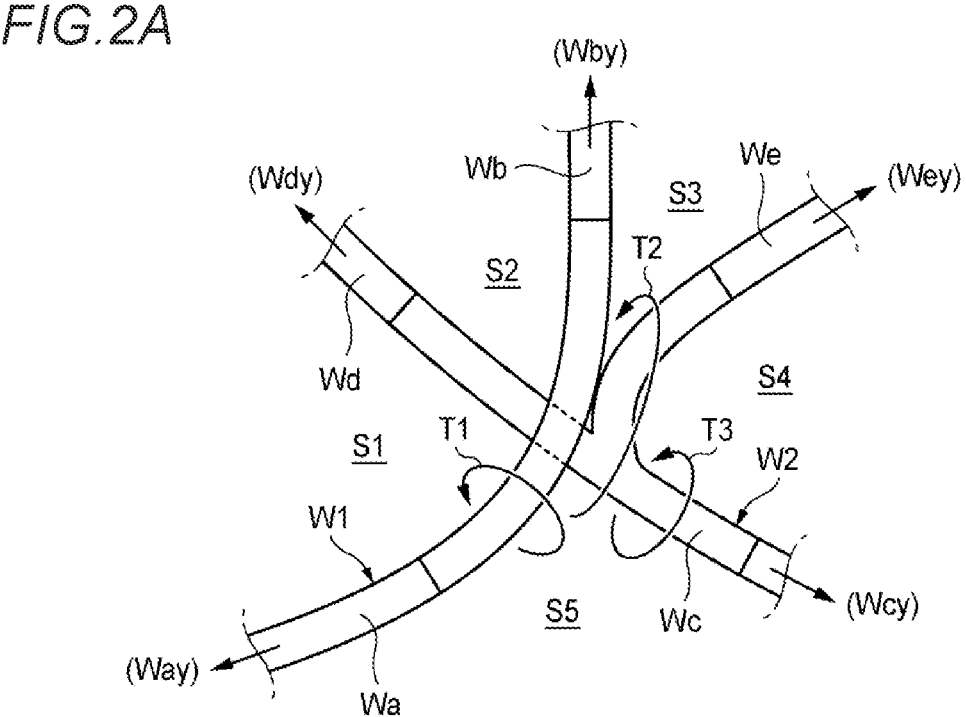
Figure 2B:
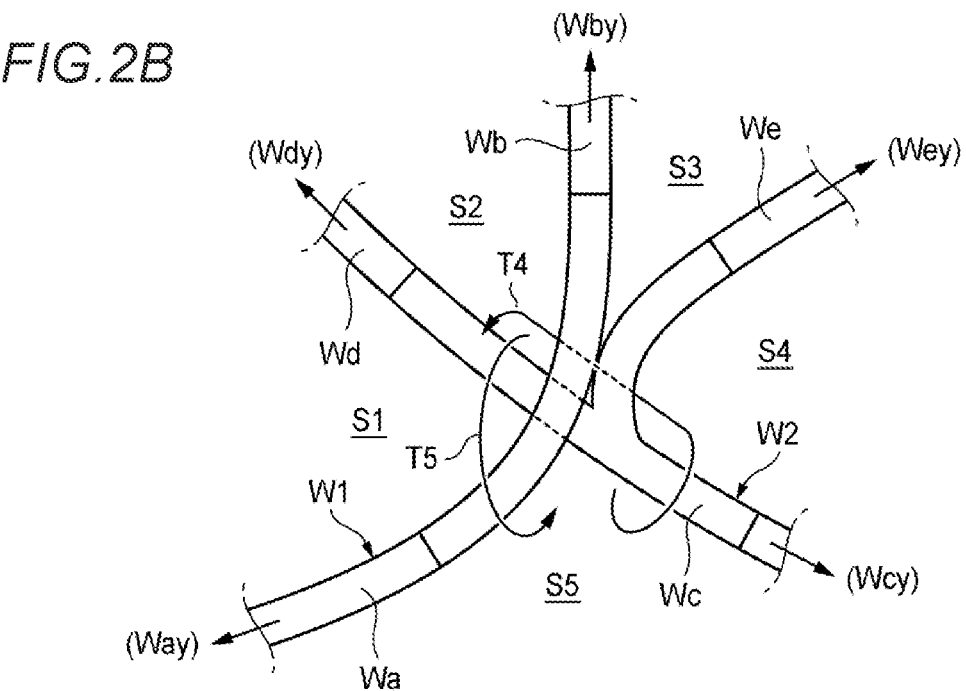
Figure 3:
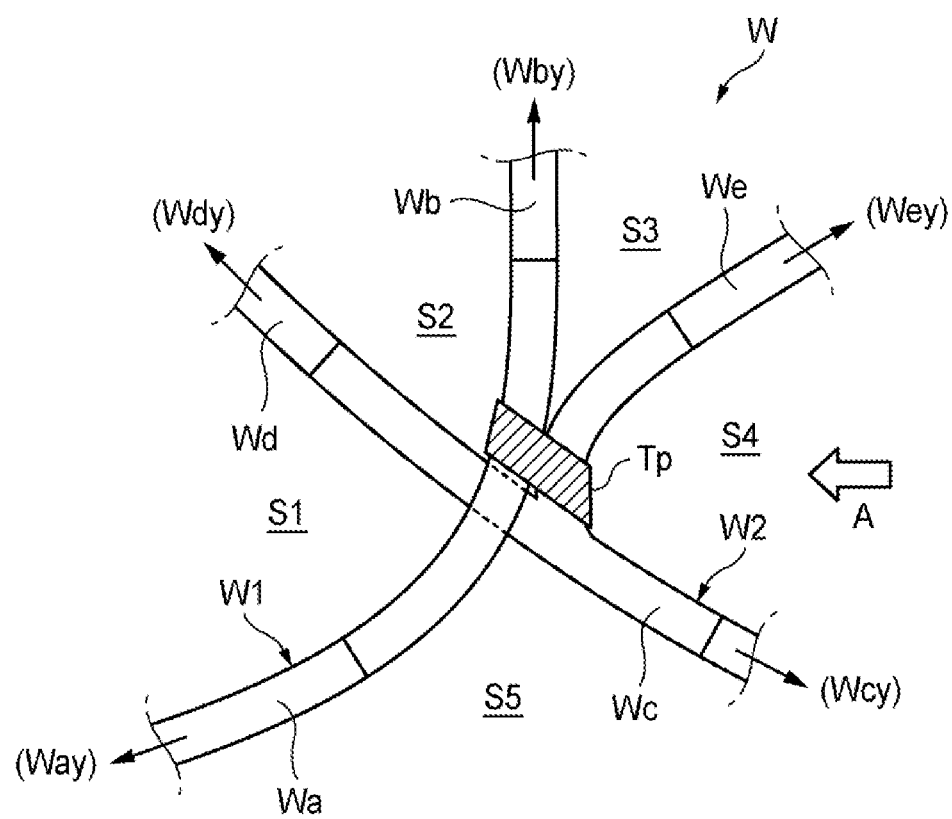
FIG. 3 is a plan view showing an outline of a completed state of the wire harness according to the embodiment.
Figure 4:
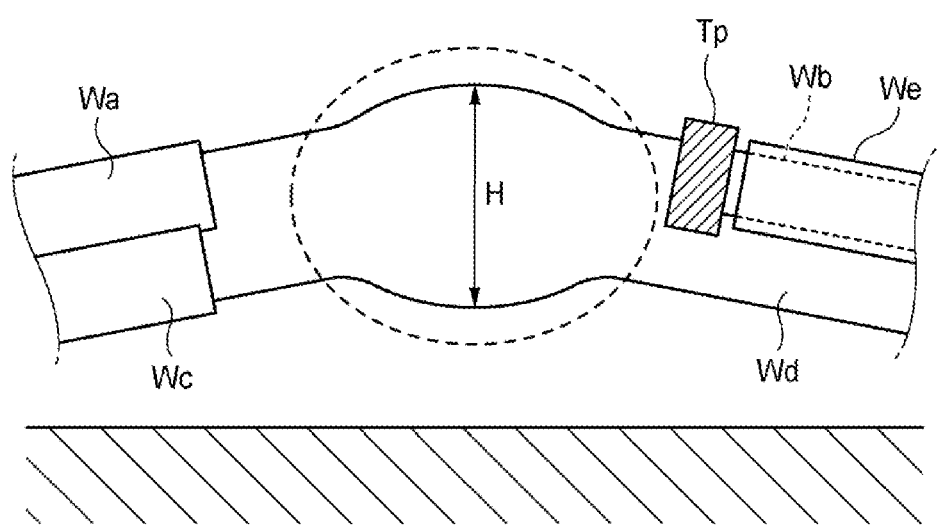
FIG. 4 is an enlarged view taken in a direction of an arrow A in FIG. 3.

FIG. 1 is a view illustrating a first step in a case of manufacturing a wire harness according to an embodiment, FIG. 2A and FIG. 2B are views illustrating a tape winding procedure, in which FIG. 2A is a procedure explanatory view of a front half part, and FIG. 2B is a procedure explanatory view of a second half part, FIG. 3 is a plan view showing an outline of a completed state of the wire harness according to the embodiment, and FIG. 4 is an enlarged view taken in a direction of an arrow A in FIG. 3.

A wire harness W of the embodiment shown in FIG. 3 is used as, for example, a wiring system of a battery pack mounted on a vehicle such as an electric vehicle or a hybrid vehicle as a traveling driving power source. The wire harness W is connected between a battery module and a voltage measurement device (for example, included in an ECU) in order to monitor a state of each of a plurality of battery cells constituting the battery module of the battery pack, and is routed in a bottom surface space of the battery pack. The bottom surface space of the battery pack is a narrow space between a bottom surface of a housing of the battery pack and a support member on which the battery module is fixedly mounted, and the wire harness W of the present embodiment, which is designed to be low in height, is routed in the narrow space.

In order to manufacture the wire harness W, as shown in FIG. 1, two harnesses, which are a linear first harness W1 and a branch type second harness W2 having a trunk line Wc and two branch lines Wd, We branched from the trunk line Wc, are prepared. The first harness W1 and the second harness W2 are combined with each other at a position of a branch portion Wx from the trunk line Wc of the second harness W2 to the branch lines Wd, We by first routing the second harness W2 on a jig plate (not shown) and routing the first harness W1 on the second harness W2.

Since an exterior such as a corrugated tube, a twist tube, or a butyl seat is mounted on outer peripheries of the first harness W1 and the second harness W2 in advance before combination, the exterior within a combination range (for example, a predetermined range of 10 mm) including the branch portion Wx is removed, and the removed portion of the exterior is lightly wound with tape from an exterior side.

At the time of the combination, the second harness W2 is aligned in a twisting direction such that the two branch lines Wd, We are arranged in a direction perpendicular to the jig plate with one branch line Wd facing downward and the other branch line We facing upward. Further, the branch line Wd on the lower side extends along an extending direction of the trunk line Wc, and the branch line We on the upper side is curved so as to be bent in a right direction by 90° with respect to the trunk line Wc. In this way, a level difference can be formed in the branch portion Wx of the two branch lines Wd. We.

Therefore, the first harness W1 is pushed in a direction of an arrow N in a form of being slightly curved in a left direction into the level difference formed in the branch portion Wx of the second harness, and is juxtaposed at the same height level as a vicinity of a base end of the branch line We on the upper side, while the first harness W1 extends across a vicinity of a base end of the branch line Wd on the lower side. In this way, the two harnesses W1, W2 are combined in a form in which both terminals Way. Wby of the first harness W1 and terminals Wcy, Wdy, and Wey of the second harness W2 extend radially from a position of the branch portion Wx.

Here, when an electric wire of the first harness W1 extending from the position of the branch portion Wx toward one terminal Way is distinguished as Wa, and an electric wire of the first harness W1 extending from the position of the branch portion Wx toward the other terminal Wby is distinguished as Wb, as shown in FIG. 2A and FIG. 2B, five electric wires Wa, Wb. Wc (trunk line), Wd (branch line), and We (branch line) extending radially from the position of the branch portion Wx are arranged in an order of Wa, Wd, Wb, We, and Wc in a clockwise direction. Further, spaces S1 to S5 can be formed between the adjacent electric wires, that is, between the electric wires Wa, Wd, between the electric wires Wd, Wb, between the electric wires Wb. We, between the electric wires We, Wc, and between the electric wires Wc, Wa. By continuously winding a tape (binding material) in a predetermined order using the spaces S1 to S5, the first harness W1 and the second harness W2 are bound in the vicinity of the branch portion Wx.

In FIG. 2A and FIG. 2B, the tape is not shown, and only the winding order is indicated by arrows T1 to T5. The order of the tape winding indicated by these arrows is an example, and any change can be made as long as the five electric wires Wa, Wb, Wc, Wd, and We are firmly fastened without greatly changing the mutual positions.

After the five electric wires Wa, Wb, Wc, Wd, and We are bound in this way, as shown in FIG. 3, the two electric wires that are juxtaposed to each other, that is, the electric wire Wb on the first harness W1 side and the electric wire (branch line) We on the second harness W2 side are both bound with another tape Tp. In this way, it is possible to fix the two electric wires to each other so that a parallel state is maintained, and it is possible to prevent the occurrence of the level difference between the two electric wires gradually due to a restoring force of the electric wire with the passage of time.

The wire harness W manufactured as described above is routed in, for example, the bottom surface space of the battery pack mounted on a vehicle. At this time, the second harness W2 is routed so as to be on the lower side. Further, the terminals Wdy, Wey of the branch lines Wd, We of the second harness W2 and the terminal Wby of the first harness W1 on a side where the terminal Wby of the first harness and the branch line We of the second harness W2 are bound with the tape Tp are connected to a bus bar module that connects the plurality of battery cells constituting the battery module of the battery pack. In addition, the terminal Way on an opposite side of the first harness W1 and the terminal Wcy of the trunk line We of the second harness W2 are connected to the voltage measurement device.

According to the wire harness W manufactured as described above, the first harness W1 extends across the vicinity of the base end of the branch line Wd on the lower side of the second harness W2 having the branch portion Wx, and the first harness W1 is bound with the tape Tp in the vicinity of the branch portion Wx together with the vicinity of the base end of the branch line We on the upper side in a juxtaposed state. Therefore, as indicated by a portion surrounded by a dotted line in FIG. 4, an overlapping height H of the harnesses can be prevented to the total thickness (minimum value) of the first harness W1 and the one branch line Wd of the second harness W2. As a result, the wire harness can be routed without any trouble in a narrow space (bottom surface space) of the bottom surface of the battery pack. In addition, since the first harness W1 is bound with the tape Tp in the vicinity of the base end of the branch line We on the upper side of the second harness W2, the level difference between the overlapping portions of the first harness W1 and the second harness W2 does not shift with the passage of time, and a stable form can be maintained.

According to the above manufacturing method, since the second harness W2 is first routed on the jig plate and the first harness W1 is then routed on the second harness W2, even when the first harness W1 is more rigid than the branch line We of the second harness W2 and is less likely to be bent, the first harness W1 can be pushed toward the branch portion Wx of the second harness W2 that is routed first without being forcibly bent and lifted. Therefore, since it is possible to reduce an unreasonable operation, it is possible to obtain an effect of making it difficult for an operator to easily generate a variation in accuracy and making it difficult to provide an unnecessary level difference.

When the battery module of the battery pack and the voltage measurement device are connected by the wire harness W, a system for monitoring the state of each of the battery cells constituting the battery module via the wire harness can be easily constructed.

In the above embodiment, the case where the first harness W1 is a linear harness has been described, but the first harness W1 may not necessarily be the linear harness and may have a branch portion. In addition, the second harness W2 having the branch portion Wx is not limited to a bifurcated branch having two branch lines Wd, We, and may be a branch having three or more branches.

In the above embodiment, the case where the wire harness W is routed in the bottom surface space of the battery pack has been described, but the present invention is not limited thereto, and the wire harness W may be applied to a case where the wire harness W is routed in a narrow space formed by electrical components mounted on the vehicle.

Here, characteristics of the wire harness, the method for manufacturing a wire harness, and a routing structure of a wire harness according to the embodiment of the present invention described above are briefly summarized and listed in the following [1] to [4], respectively.

[1] A wire harness (W) including
a first harness (W1); and
a second harness (W2) having a trunk line (Wc) and a plurality of branch lines (Wd, We) branched from the trunk line (Wc), wherein the first harness and the second harness are combined and bound at a position of a branch portion (Wx) from the trunk line (Wc) to the branch lines (Wd. We), wherein each of terminals (Way, Wby, Wcy, Wdy, Wey) of the first harness (W1) and the second harness (W2) is extended from the position of the branch portion (Wx), wherein the first harness (W1) and the second harness (W2) are in a state in which exteriors are removed within a combination range of the first harness (W1) and the second harness (W2), and wherein the first harness (W1) extends across a vicinity of a base end of one branch line (Wd) among the plurality of branch lines (Wd, We) of the second harness (W2) at a position in a vicinity of the branch portion (Wx), and is bound with a binding material (Tp) in the vicinity of the branch portion (Wx) together with a vicinity of a base end of another branch line (We) in a juxtaposed state.

[2] A method for manufacturing a wire harness (W) including a first harness (W1) and a second harness (W2) having a trunk line (Wc) and a plurality of branch lines (Wd, We) branched from the trunk line (Wc), the method including combining and binding the first harness and the second harness at a position of a branch portion (Wx) from the trunk line (Wc) to the branch lines (Wd, We), extending each of terminals (Way, Wby, Wcy, Wdy, Wey) of the first harness (W1) and the second harness (W2) from the position of the branch portion (Wx), removing exteriors of the first harness (W1) and the second harness (W2) within a combination range of the first harness (W1) and the second harness (W2);

routing the second harness (W2) on a jig plate, and routing the first harness (W1) on the second harness (W2);

while causing the first harness (W1) to extend across a vicinity of a base end of one branch line (Wd) among the plurality of branch lines (Wd, We) of the second harness (W2), pushing the first harness (W1) into the branch portion (Wx) of the second harness (W2) and juxtaposing the first harness (W1) to a vicinity of a base end of another branch line (We); and in this state, in the vicinity of the branch portion (Wx), binding the first harness (W1) by a binding material (Tp) together with the vicinity of the base end of the other branch line (We).

[3] A routing structure of a wire harness (W) in a narrow space formed by electrical components mounted on a vehicle, the wire harness (W) including a first harness (W1) and a second harness (W2) having a trunk line (Wc) and a plurality of branch lines (Wd, We) branched from the trunk line (Wc), wherein the wire harness (W) has a shape in which respective terminals (Way, Wby, Wcy, Wdy, Wey) of the first harness (W1) and the second harness (W2) are extended from a position of a branch portion (Wx) by combining and binding the first harness (W1) and the second harness (W2) at a position of the branch portion (Wx) from the trunk line (Wc) to the branch lines (Wd, We), wherein the first harness (W1) and the second harness (W2) are in a state in which exteriors are removed within a combination range of the first harness (W1) and the second harness (W2), wherein the first harness (W1) extends across a vicinity of a base end of one branch line (Wd) among the plurality of branch lines (Wd, We) of the second harness (W2) at a position in a vicinity of the branch portion (Wx), and is bound with a binding material (Tp) in the vicinity of the branch portion (Wx) together with a vicinity of a base end of another branch line (We) in a juxtaposed state, and wherein the wire harness (W) is routed in the narrow space.

[4] The routing structure of a wire harness (W) according to [3], wherein the electrical component is a battery pack, wherein the wire harness (W) is connected between a battery module and a voltage measurement device in order to monitor a state of each of a plurality of battery cells constituting the battery module of the battery pack, and wherein the terminals (Wdy, Wey) of the branch lines (Wd, We) of the second harness (W2) and the terminal (Wby) of the first harness (W1) on a side where the terminal (Wby) of the first harness and the branch line (We) of the second harness (W2) are bound are connected to a bus bar module connecting the plurality of battery cells constituting the battery module of the battery pack.

According to the wire harness having the configuration of the above [1], the first harness extends across the vicinity of the base end of the one branch line of the second harness having the branch portion, and is bound with the binding material in the vicinity of the branch portion together with the vicinity of the base end of the other branch line in a juxtaposed state. Therefore, the overlapping height of the harnesses can be prevented to the total thickness (minimum value) of the first harness and the one branch line of the second harness, and as a result, the wire harness can be routed without any trouble in a narrow space (bottom surface space) of the bottom surface of the battery pack. In addition, since the first harness is bundled with the binding material in the vicinity of the base end of the other branch line of the second harness, the level difference of the overlapping portion of the first harness and the second harness does not shift with the passage of time, and the stable form can be maintained.

According to the method for manufacturing a wire harness having the configuration of the above [2], the first harness is juxtaposed to the vicinity of the base end of the other branch line in the vicinity of the branch portion while extending across the vicinity of the base end of the one branch line of the second harness having the branch portion, and in this state, the first harness is bound with the binding material together with the vicinity of the base end of the other branch line of the second harness in the vicinity of the branch portion. Therefore, it is possible to make the wire harness in which the overlapping height of the harnesses is prevent to the total thickness (minimum value) of the first harness and the one branch line of the second harness. In addition, since the first harness is bundled in the vicinity of the base end of the other branch line of the second harness, the level difference of the overlapping portion of the first harness and the second harness does not shift with the passage of time, and the wire harness having the stable form can be obtained. As a result, the manufactured wire harness can be routed without any trouble in a narrow space (bottom surface space) of the bottom surface of the battery pack. Further, at the time of manufacturing, since the second harness is first routed on the jig plate and the first harness is then routed on the second harness, even when the first harness is more rigid than the branch line of the second harness and is less likely to be bent, the first harness can be pushed toward the branch portion (near the proximal end of the branch line) of the second harness that is routed first without being forcibly bent and lifted. Therefore, since it is possible to reduce an unreasonable operation, it is possible to obtain an effect of making it difficult for an operator to easily generate a variation in accuracy and making it difficult to provide an unnecessary level difference.

According to the routing structure of a wire harness having the configuration of the above [3], since the first harness extends over the vicinity of the base end of the one branch line of the second harness having the branch portion and is bound in the vicinity of the branch portion together with the vicinity of the base end of the other branch line in a juxtaposed state, so that the overlapping height of the harnesses is prevented to the total thickness (minimum value) of the first harness and the one branch line of the second harness. Therefore, the wire harness can be routed without any trouble in a narrow space such as a narrow space in the bottom surface of the battery pack. In addition, since the first harness is bundled in the vicinity the base end of the other branch line of the second harness, the level difference of the overlapping portion of the first harness and the second harness does not shift with the passage of time due to an influence of the vibration of the vehicle or the like, and the stable form can be maintained.

According to the routing structure of a wire harness having the configuration of the above [4], the terminals of the branch lines of the second harness and the terminal of the first harness on a side where the terminal of the first harness and the branch line of the second harness are bundled are connected to the bus bar module connecting the plurality of battery cells constituting the battery module of the battery pack. Therefore, it is possible to easily construct a system for monitoring the state of each battery cell via the wire harness.

According to the present invention, since the height of the overlapping portion of the two harnesses to be combined can be minimized, routing can be performed without any trouble in a narrow space (bottom surface space) of the bottom surface of the battery pack.

What is claimed is:

1. A wire harness comprising:
   a first harness, and
   a second harness having a trunk line and a plurality of branch lines branched from the trunk line,
   wherein the first harness and the second harness are combined and bound at a position of a branch portion from the trunk line to the branch lines,
   wherein each of terminals of the first harness and the second harness is extended from the position of the branch portion,
   wherein exteriors of the first harness and the second harness are removed within a combination range of the first harness and the second harness, and
   wherein the first harness extends across a vicinity of a base end of one branch line among the plurality of branch lines of the second harness at a position near the branch portion, and is bound with a binding material in the vicinity of the branch portion together with a vicinity of a base end of another branch line in a juxtaposed state.

2. A method for manufacturing a wire harness having a first harness and a second harness having a trunk line and a plurality of branch lines branched from the trunk line, the method comprising:

combining and binding the first harness and the second harness at a position of a branch portion from the trunk line to the branch lines;

extending each of terminals of the first harness and the second harness from the position of the branch portion;

removing exteriors of the first harness and the second harness within a combination range of the first harness and the second harness;

routing the second harness on a jig plate, and routing the first harness on the second harness;

while causing the first harness to extend across a vicinity of a base end of one branch line among the plurality of branch lines of the second harness, pushing the first harness into the branch portion of the second harness and juxtaposing the first harness to a vicinity of a base end of another branch line; and subsequently, in the vicinity of the branch portion, binding the first harness by a binding material together with the vicinity of the base end of the other branch line.

3. A routing structure of a wire harness in a narrow space formed by electrical components mounted on a vehicle, the wire harness including a first harness and a second harness having a trunk line and a plurality of branch lines branched from the trunk line, wherein the wire harness has a shape in which each of terminals of the first harness and the second harness are extended from a position of a branch portion by combining and binding the first harness and the second harness at a position of the branch portion from the trunk line to the branch lines, wherein the first harness and the second harness are in a state in which exteriors are removed within a combination range of the first harness and the second harness, wherein the first harness extends across a vicinity of a base end of one branch line among the plurality of branch lines of the second harness at a position in a vicinity of the branch portion, and is bound with a binding material in the vicinity of the branch portion together with a vicinity of a base end of another branch line in a juxtaposed state, and wherein the wire harness is routed in the narrow space.

4. The routing structure of a wire harness according to claim 3, wherein the electrical component is a battery pack, wherein the wire harness is connected between a battery module and a voltage measurement device in order to monitor a state of each of a plurality of battery cells constituting the battery module of the battery pack, and wherein each of the terminals of the branch lines of the second harness and the terminal of the first harness on a side where the terminal of the first harness and the branch line of the second harness are bound are connected to a bus bar module connecting the plurality of battery cells constituting the battery module of the battery pack.

* * * * *